UNITED STATES PATENT OFFICE.

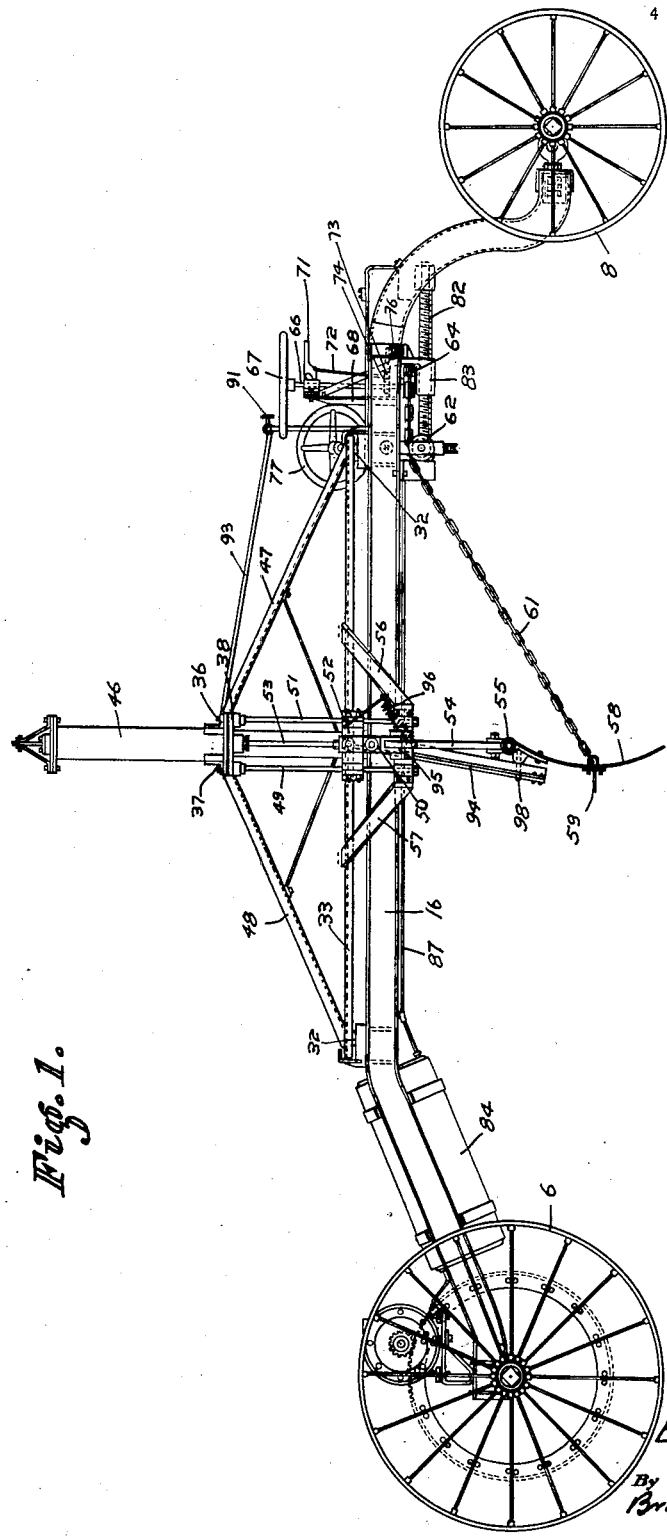

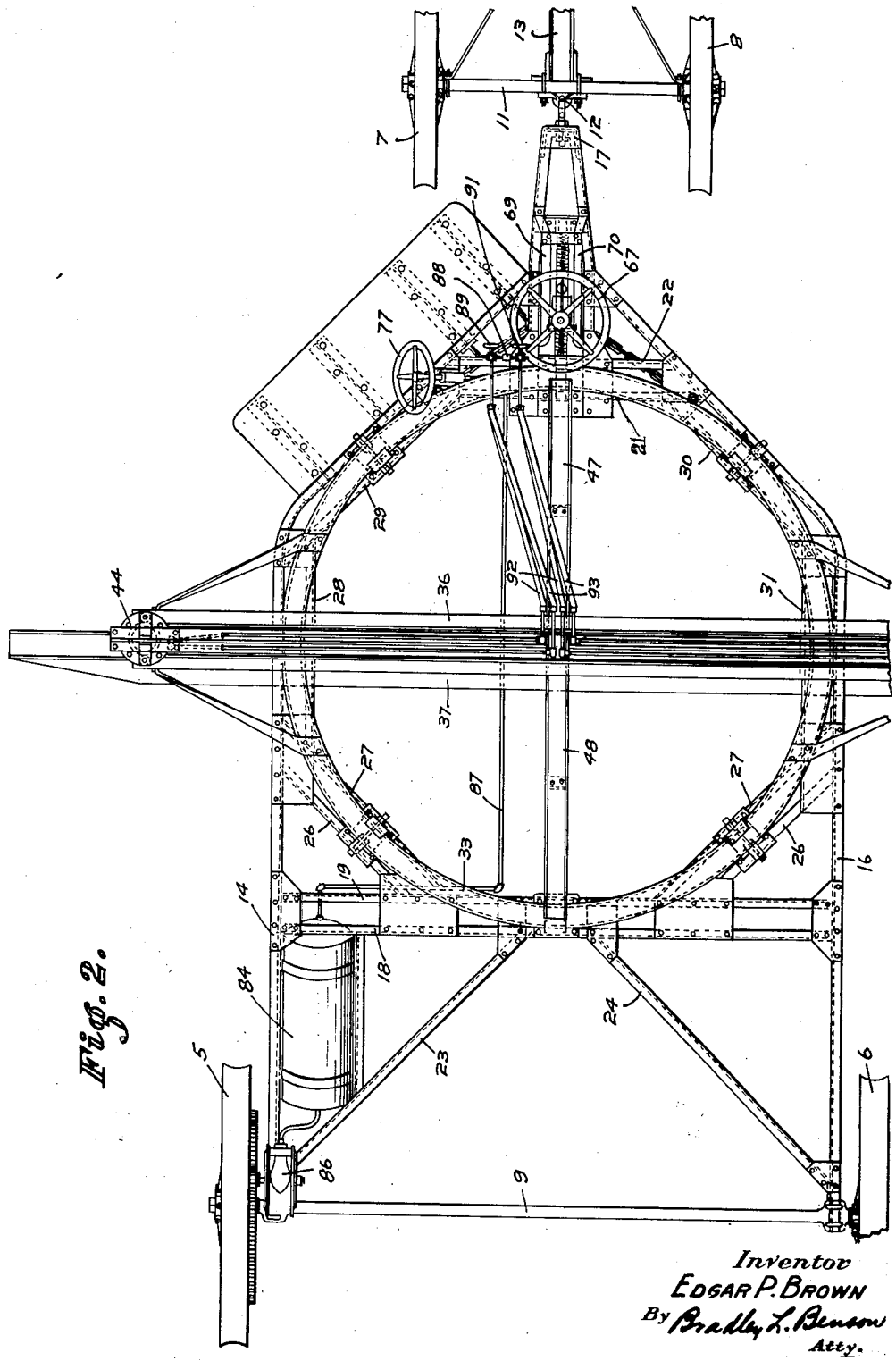

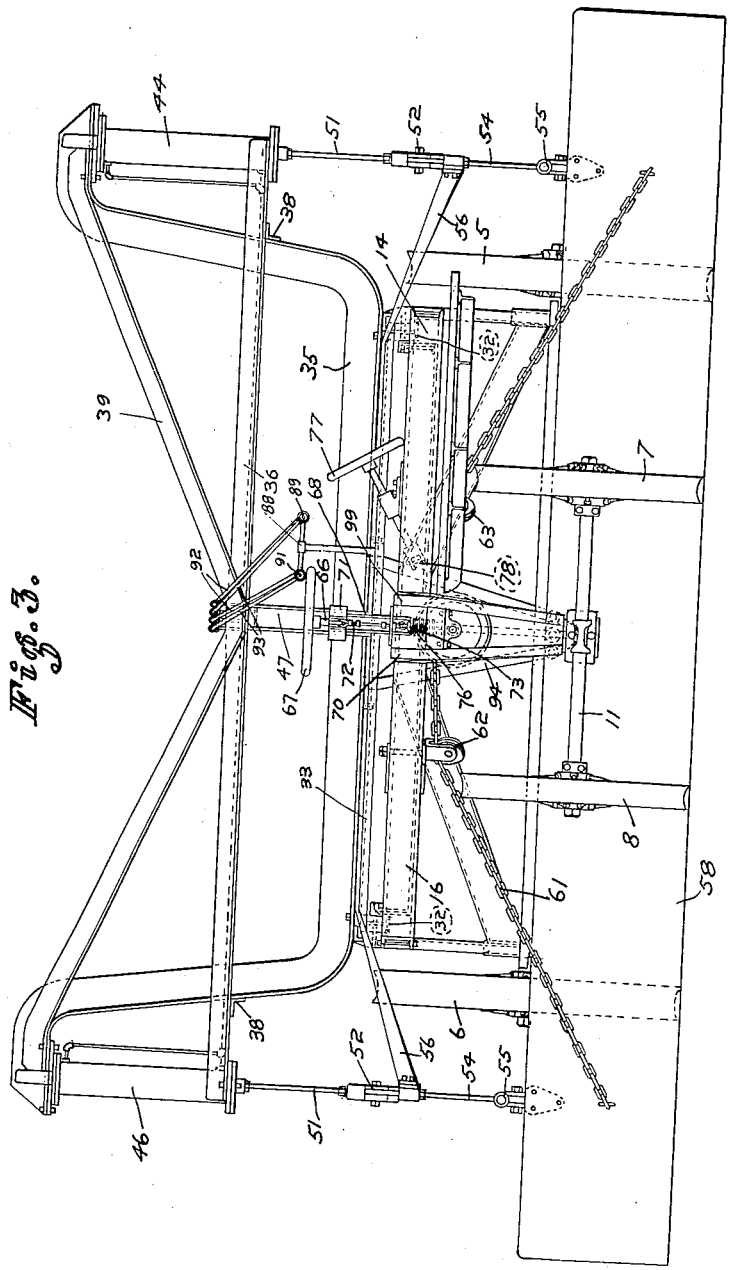

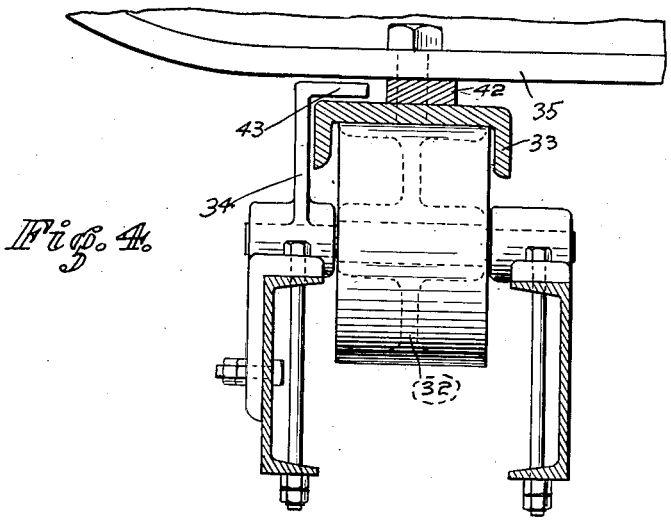
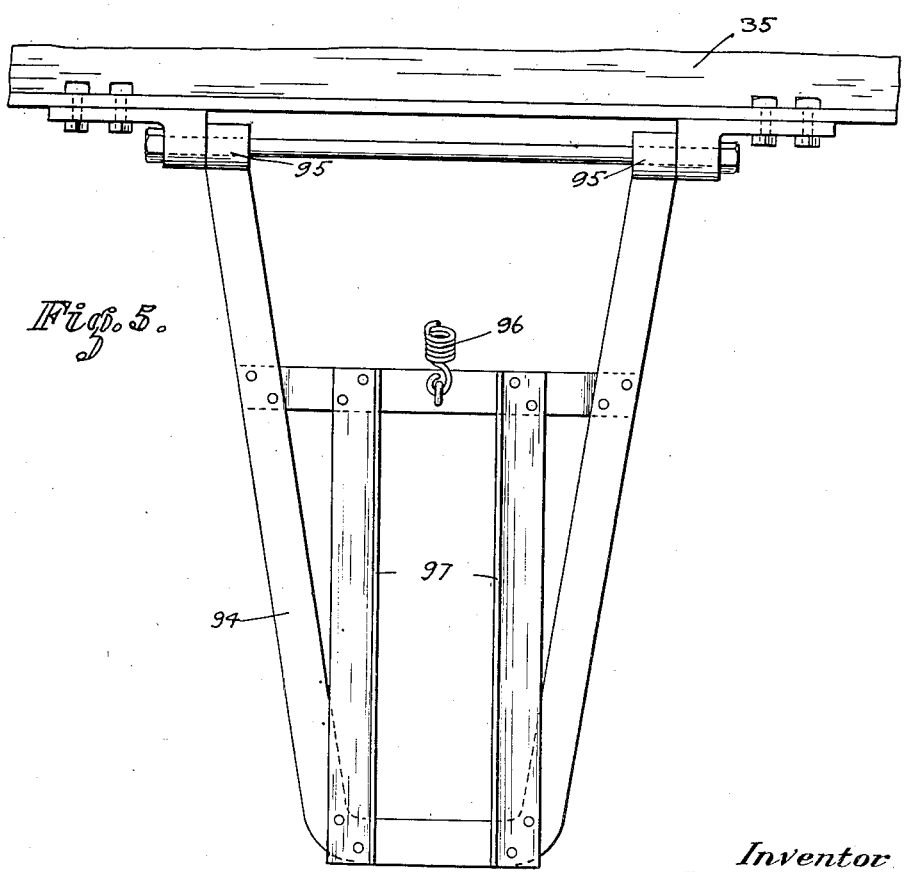

EDGAR P. BROWN, OF MADERA, CALIFORNIA.

GRADING-MACHINE.

1,347,008.  Specification of Letters Patent.  Patented July 20, 1920.

Application filed July 28, 1919. Serial No. 313,932.

*To all whom it may concern:*

Be it known that I, EDGAR P. BROWN, a citizen of the United States, and a resident of Madera, county of Madera, State of California, have made a new and useful invention—to wit, Improvement in Grading-Machines; and I do hereby declare the following to be a full, clear, concise, and exact description of the same.

This invention relates to a new, novel and useful improvement in grading machines, and particularly to the type commonly known as land levelers.

The principal object of this invention is to produce a land leveler which may be operated behind a high power tractor thereby utilizing the power of the tractor, and at the same time covering large areas.

Another object of this invention is to produce a grader which is simple to operate.

Another object is to provide a grader which will operate efficiently under enormous stress.

Other objects and advantages of this invention will appear as the description proceeds.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying drawings,

Figure 1 is a side elevation of my improved grader.

Fig. 2 is a top plan view of Fig. 1.

Fig. 3 is a front end elevation of Fig. 1.

Fig. 4 is a detail view of a supporting roller.

Fig. 5 is a detail view of the scraper alinement control.

Referring to the drawings in detail, like numerals refer to corresponding parts in the several views. The numerals 5 and 6 designate the rear wheels of the grader and the numerals 7 and 8 the front wheels thereof. These wheels are mounted upon axles 9 and 11, the axle 11 being pivoted at 12 and provided with a hole 13. The axle 9 is attached to side sills 14 and 16 which are bent as shown in Fig. 1, and converge to a point 17 where they join through the pivot 12 to the front axle 11.

It will be noted by this construction that a large space is provided beneath the framework to accommodate a scraper hereinafter described. It will also be noted that by this construction the front wheels 7 or 8 may be cramped so that a short turn may be made. The sills 14 and 16 are connected by parallel cross beams 18 and 19 and parallel cross beams 21 and 22 near the forward part.

Suitable braces 23 and 24 are provided, the purpose of which is obvious. The sills 14 and 16 are connected with the parallel cross member 19 by parallel members 26 and 27. Members 28 and 29 are provided at points parallel to the sill 14 and members 30 and 31 are provided at points parallel to the sill 16. It will thus be seen that a construction has been provided which forms a hexagonal frame having parallel sides. This frame is adapted to support eight rollers 32, which in turn support a circular channel iron member 33. Clips 34 are provided adjacent the rollers 32 for the purpose of maintaining the circular channel iron member 33 in contact at all times with the said rollers.

This circular channel iron is adapted to support a goose-neck 35, which in turn is strengthened by parallel angle irons 36 and 37 which project beyond the sides of the goose-neck 35 and are further fastened by short angle irons 38. The upper ends of the goose-neck are strengthened by a T iron 39 riveted at its center portion 41 to the angle irons 36 and 37. Blocks 42 are provided beneath the goose-neck 35 and between the circular channel iron 33, the purpose of which is to allow sufficient clearance for the tip 43 of the clip 34. The outer ends of the goose-neck 35 support pneumatic cylinders 44 and 46, the purpose of which will be hereinafter described. The goose-neck 35 supporting the cylinders 44 and 46 is prevented from tipping by trusses 47 and 48, see Fig. 1. Attached to the lower ends of the cylinders 44 and 46 are guide rods 49 and 51, which carry cross-heads 52 reciprocated by the piston rods 53. These cross-heads are provided at their lower ends with universal joints 50 and are attached by links 54 to a universal joint 55. The lower ends of the guide rods 49 and 51 are held in proper alinement by suitable braces such as is shown at 56 and 57. The universal joints 55 are in turn attached to the upper edge of a scraper blade 58 which blade is in turn strengthened throughout its length by a T iron 59. A chain 61 is attached to both ends of the scraper 58 at a point beneath the universal joint 55, and is carried forwardly and reeved over sheaves 62 and 63, thence around a sheave 64, which is a chain sheave, and is mounted upon the end of a shaft 66 having a hand-wheel 67. This hand-wheel, shaft and sheave 64 are journaled in a frame 68, the lower portion of which is adapted to travel between the guides 69 and 70. This frame 68 supports a hand-lever 71 attached through a link 72 to the end of a spring pressed detent 73, best shown in Fig. 1. The end of the detent is adapted to enter openings formed within a collar 74, thus preventing the shaft 66 from rotating. The operator of the machine may also operate this latch 73 by stepping upon the same at a point above the spring 76. The frame 68 and its associated parts may be moved forwardly or rearwardly between the guides 69 and 70 by rotating the hand-wheel 77, which in turn operates through a universal joint 78, worm 79 and worm gear 81. This worm gear is attached to a screw 82, which is engaged by the nut 83 formed upon the frame 68.

It will thus be seen that by rotating the hand-wheel 67, the chain 61 will be drawn in at one side over the chain sheave 64 and paid out on the other side. This will result in the scraper 58 being rotated with respect to the center line of the vehicle. As the links 54 supporting the scraper 58 are rigidly supported by the braces 56 and 57, movement of the blade will cause the circular channel member and its parts supported thereon to rotate on the frame. Rotation of the hand-wheel 77 will cause the screw 82 to impart forward or rearward movement through the nut 83 to the chain sheave 64. Movement of this sheave will serve to lengthen or decrease the length of the chain 61 between the ports 59 and 62 thereby changing the angle of the scraper 58. Upward and downward movement of the scraper 58 is accomplished through the medium of compressed air which is stored in a tank 84 and may be derived from any suitable source, here shown as a compressor 86 suitably geared to the wheel 6. This compressed air is led through a pipe 87 to a distributing head 88 from whence it passes to suitable valves 89 and 91, which valves in turn are connected through flexible pipes 92 and 93 to the point 90 from this point the air passes to the top and bottom of cylinders 44 and 46. It will thus be seen that by suitably manipulating the valves 89 and 91, the scraper 58 will be raised or lowered, and as the cylinders are independently controlled either end of the scraper may be raised. The scraper 58 is prevented from moving laterally with respect to the center of the machine by an A shaped brace 94. This brace is pivoted as at 95 to the under side of the goose-neck 35 and has its upper end attached by a spring 96 to a point upon the frame. The construction of this A frame 94 is best shown in Fig. 5. Parallel angle irons 97 are so placed as to engage a pin 98 attached to the rear upper edge of the scraper. The spring 96 serves to keep the A frame 94 in contact with the pin and the strength of the frame is sufficient to prevent any lateral movement.

Having thus described my invention what I claim as new and desire to secure by Letters Patent of the United States is as follows:

1. In a grading machine, the combination of a wheeled vehicle, a rotatable member mounted on said vehicle, rollers interposed between said vehicle and said rotatable member, a goose neck rigidly attached to said rotatable member, pneumatic cylinders vertically mounted at the outer ends of said goose neck, a scraper located beneath said vehicle, pistons mounted in said pneumatic cylinders, said pistons being connected to the opposite ends of said scraper and capable of independently raising and lowering the opposite ends of said scraper.

2. In a grading machine, the combination of a wheeled vehicle, a rotatable member mounted on said vehicle, rollers interposed between said vehicle and said rotatable member, a goose neck rigidly attached to said rotatable member, pneumatic cylinders vertically mounted at the outer ends of said goose neck, a scraper located beneath said vehicle, pistons mounted in said pneumatic cylinders, said pistons being connected to the opposite ends of said scraper and capable of independently raising and lowering the opposite ends of said scraper, and valves adapted to control the action of said pistons within said pneumatic cylinders.

3. In a grader, the combination of a vehicle, a scraper vertically and rotatably mounted beneath said vehicle, means for rotating said scraper and controlling the angle of contact of said scraper with the ground, said means comprising a flexible member attached to the ends of said scraper at a point beneath its attachment to said vehicle and at a point beneath its center of oscillation, said flexible member being reeved over fixed sheaves and a movable sheave.

4. In a grading machine, the combination of a wheeled vehicle, a scraper mounted beneath said vehicle, a frame carried on said vehicle and adapted to rotate, means carried on said frame for suspending said scraper, sheaves mounted on the forward portion of said vehicle, a sheave vertically mounted upon a shaft forward of said last mentioned sheaves, a chain passing over said sheaves for the purpose of rotating said scraper, and means for moving said vertically mounted sheave longitudinally on said vehicle.

In testimony whereof, I have hereunto set my hand at San Francisco, California, this 21st day of July 1919.

EDGAR P. BROWN.